Figure 1:
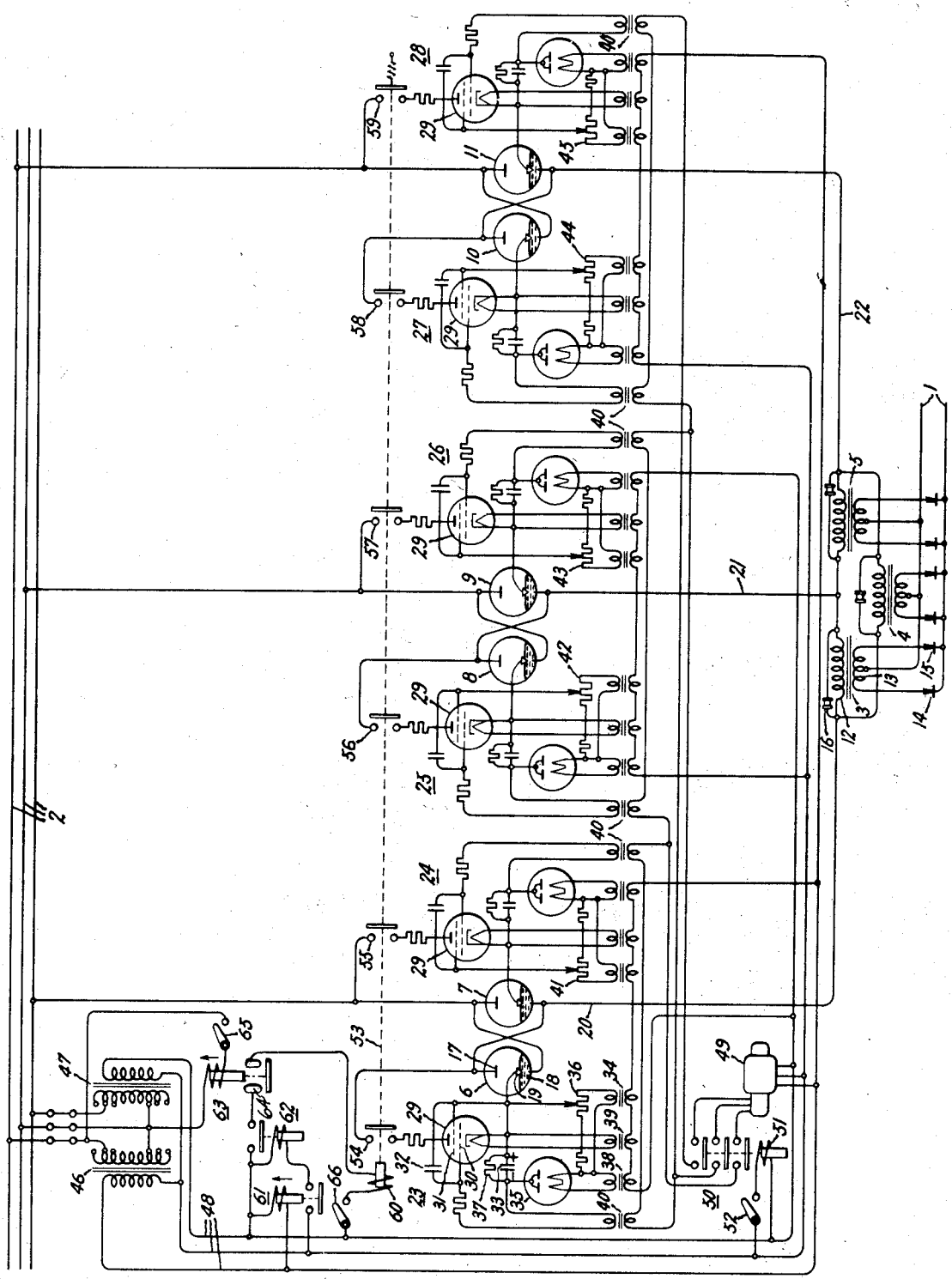

Sept. 18, 1945. O. W. LIVINGSTON 2,384,937
ELECTRIC VALVE TRANSLATING APPARATUS
Filed April 23, 1942 2 Sheets-Sheet 1

Inventor:
Orrin W. Livingston,
by Harry E. Dunham
His Attorney.

Patented Sept. 18, 1945

2,384,937

UNITED STATES PATENT OFFICE 2,384,937

ELECTRIC VALVE TRANSLATING APPARATUS

Orrin W. Livingston, Scotia, N. Y., assignor to General Electric Company, a corporation of New York Application April 23, 1942, Serial No. 440,160

12 Claims. (Cl. 175—363)

My invention relates to electric translating apparatus and more particularly to electric valve translating apparatus for interconnecting an alternating current supply circuit and a direct current load circuit.

In some industrial applications, it is important to provide equipment for supplying relatively heavy direct currents to an associated load circuit where the source of energy is alternating current. In accordance with the teachings of my invention described hereinafter, I provide new and improved electric valve apparatus wherein relatively large or heavy unidirectional currents may be transmitted to a load circuit and wherein not only the magnitude of the current transmitted to the load circuit is accurately determinable, but the period of time or interval of energization of the load circuit is precisely controllable or adjustable.

It is an object of my invention to provide new and improved electric valve translating systems.

It is another object of my invention to provide new and improved control systems for electric valve translating apparatus.

It is a further object of my invention to provide new and improved control systems for electric valve translating apparatus wherein the energization of a direct current load circuit is accurately controllable during predetermined intervals of time.

It is a still further object of my invention to provide new and improved electric valve translating apparatus for interconnecting alternating current and direct current circuits.

It is a still further object of my invention to provide new and improved control systems for electric valve translating apparatus wherein a direct current load circuit may be periodically energized from a source of alternating current, and wherein the system operates to effect such periodic or intermittent energization of the load circuit in a manner to prevent the occurrence of transient starting currents.

Briefly stated, in one of the illustrated embodiments of my invention I provide an electric valve translating system for energizing a direct current load circuit from a polyphase alternating current supply circuit. Polyphase transforming means may be employed and a plurality of pairs of reversely connected electric valve means are connected between different phases of the supply circuit and the transforming means for transmitting thereto alternating current. Rectifying means, such as a plurality of biphase rectifiers, are connected between the transforming means and the load circuit. The pairs of electric valve means are provided with associated control or excitation circuits and include means for rendering the respective pairs of electric valve means conductive in a predetermined order or sequence in a manner so that any one pair conducts current during a period of time during each cycle of voltage of the supply circuit not less than 60 electrical degrees and not greater than 120 electrical degrees, thereby assuring the desired accuracy of the energization of the load circuit.

In another embodiment of my invention diagrammatically illustrated, I provide an arrangement wherein unidirectional current is transmitted to a direct current load circuit from a polyphase alternating current supply circuit. Timing means, such as an electric valve inverter, is provided for effecting a single energization of the load circuit for a predetermined time, or for effecting intermittent or periodic energization of the direct current load circuit. Pairs of reversely connected electric valve means are connected between transforming means and different phases of the supply circuit, and rectifying means are connected between the load circuit and the transforming means. Additional means are also provided for controlling the conductivities of the pairs of reversely connected electric valve means so that initiation of conduction of the respective pairs of electric valve means begins during the respective phase voltages at times corresponding to the power factor angle of the load imposed on the supply circuit, thereby eliminating the starting current transients.

Figure 2:
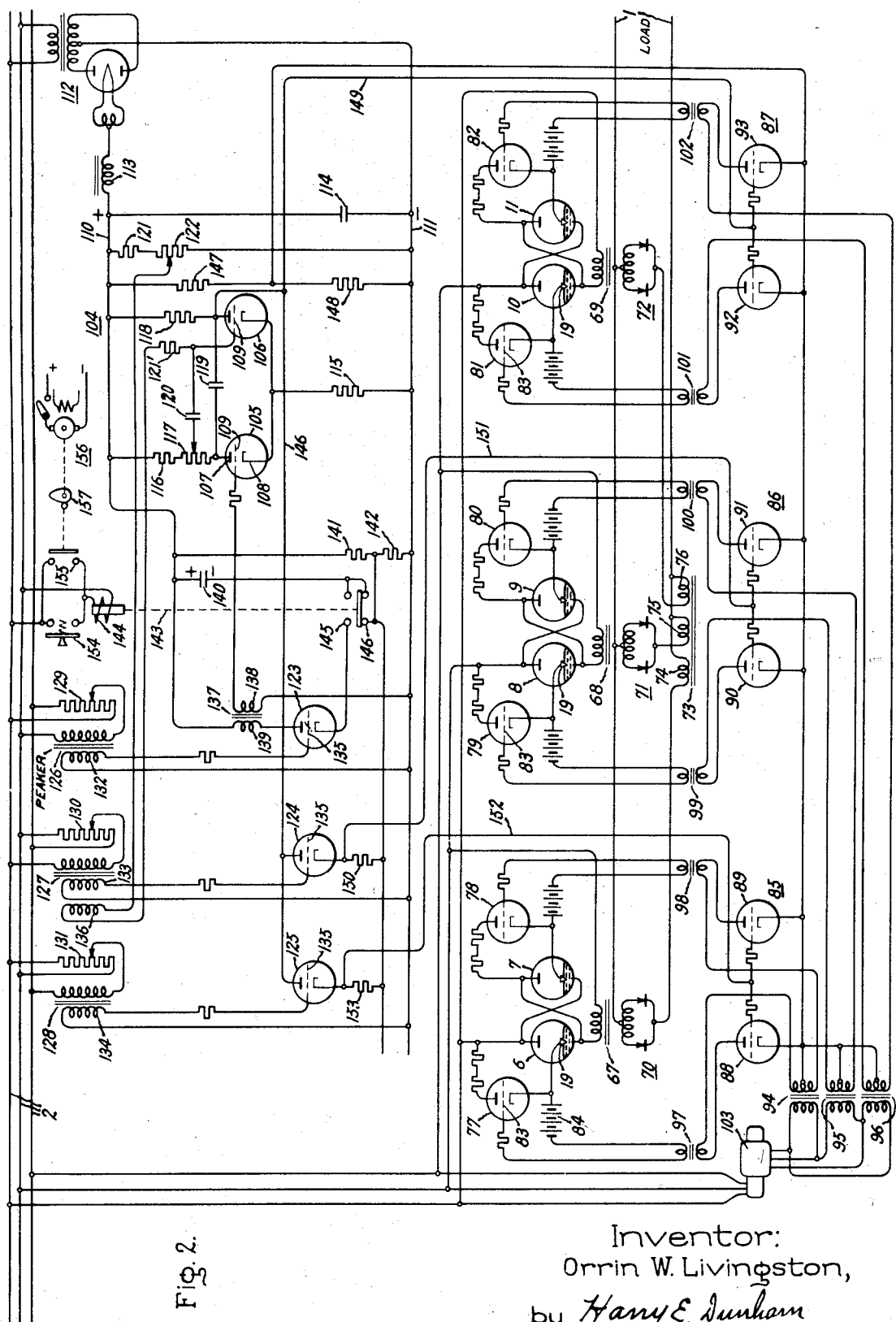

For a better understanding of my invention, reference may be had to the following description taken in connection with the accompanying drawings, and its scope will be pointed out in the appended claims. Fig. 1 diagrammatically illustrates an embodiment of my invention as applied to a system for energizing a direct current load circuit from a three phase alternating current supply circuit. Fig. 2 diagrammatically illustrates another embodiment of my invention wherein periodic energization of a direct current load circuit is obtained, and wherein the system is controlled to lessen the duty imposed on the supply circuit.

Referring now to Fig. 1 of the accompanying drawings, my invention is there diagrammatically illustrated as applied to a system for energizing a direct current load circuit, such as a welding circuit 1, from a polyphase alternating current supply circuit 2. Polyphase transforming means, such as transformers 3, 4 and 5, are connected to be energized from different phases of the supply circuit 2 through pairs of reversely connected electric valve means 6 and 7, 8 and 9, and 10 and 11. The electric valve means 6-11, inclusive, are connected to transmit alternating current to the associated transforming means, and the energization of each of the transforming means 3-5 is obtained by current flow through the various pairs of electric valve means.

Transformers 3-5 are each provided with primary winding means 12 connected to the different phases of the supply circuit 2 through associated pairs of electric valve means and each includes secondary winding means 13 which, cooperating with rectifying means 14 and 15, constitute a biphase rectifier for transmitting direct current to the welding circuit 1. The rectifying means 14 and 15 may be of the dry type, such as copper oxide rectifiers, and may be designed to comprise a plurality of rectifiers in parallel, series, or series-parallel relation in order to satisfy the load requirements. It will be noted that three biphase rectifiers are employed and that the rectified output currents thereof are displaced in accordance with the phases of the voltages applied to transformers 3-5, inclusive. Voltage limiting means are associated with transformers 3-5, inclusive. These voltage limiting means may comprise devices connected across the primary winding means 12. I may employ voltage limiting means, such as resistances 16, having negative nonlinear current-voltage characteristics.

The electric valve means 6-11 may each be of the type employing an ionizable medium, such as a gas or a vapor, and each comprises an anode 17, a cathode 18 and a control means which may be an immersion-igniter control member 19 associated with the cathode and constructed of a material such as boron-carbide or silicon-carbide so that when sufficient current is transmitted thereto the medium of the electric valve means is ionized and the electric valve means conducts current. Transformer 3 is connected to one phase of the supply circuit 2 through electric valve means 6 and 7, conductor 20, conductor 21 and electric valve means 8 and 9. Transformer 4 is connected to another phase of the supply circuit 2 through electric valve means 6 and 7, conductor 20, conductor 22, and electric valve means 10 and 11. Transformer 5 is connected to a still different phase of the supply circuit 2 through electric valve means 8 and 9, conductor 21, conductor 22 and electric valve means 10 and 11.

I provide a plurality of excitation circuits 23-28, inclusive, associated with electric valve means 6-11, respectively. These excitation circuits are similar in construction and arrangement and in order to facilitate description of my invention, only excitation circuit 23 will be described in detail. Referring to excitation circuit 23, I provide a control electric discharge device 29 which is employed for energizing the control member 19 of the electric valve means 6 and which when in a conducting condition transmits unidirectional current to the control member 19 from the associated phase of the supply circuit 2. The electric discharge device 29 may be of the type employing an ionizable medium, such as a gas or a vapor, and may include a control means such as a control grid 30 the potential of which controls the current conducted by the discharge device. A further control grid, such as a shield grid 31, may be connected to the cathode, and a transient voltage absorption means, such as a capacitance 32, may be connected between the control grid 30 and the cathode.

I also provide in excitation circuit 23 means for impressing on grid 30 a biasing potential, such as a negative unidirectional biasing potential, to maintain the electric discharge device 29 nonconducting except during predetermined times during the cycle of the associated phase voltage. This means may comprise a capacitance 33 which is energized from a transformer 34 energized by a suitable source of alternating current described hereinafter. A suitable rectifying means, such as an electric valve 35, may be connected in circuit with the capacitance 33 and the secondary winding of transformer 34. I provide control or adjusting means, such as an adjustable resistance 36, connected in series relation with the rectifier 35 and the capacitance 33 to control the magnitude of the negative unidirectional biasing potential and thereby afford a means for controlling the period of time during each cycle of phase voltage of the supply circuit 2 during which the electric valve 6 may be initiated in its conduction of current. A discharge path comprising a resistance 37 is connected across the capacitance 33. Transformers 38 and 39 may be employed as sources of cathode energizing current for the filaments of the electric discharge device 29 and the electric valve 35. It will be understood that instead of using an electric valve of the discharge type, I may employ in place of the electric valve 35 a rectifier of the dry type.

In order to control precisely the time at which the electric discharge device 29 and, hence, the electric valve means 6 are rendered conducting during the cycle of associated phase voltage, I provide a transformer 40 connected in circuit with the cathode and the grid 30 of electric discharge device 29. This transformer, if desired, may be of the type designed to produce an alternating or periodic voltage of peaked wave form, thereby obtaining the desired precision and accuracy in the control of the electric discharge device 29 and electric valve means 6.

The above description relating to excitation circuit 23 also applies to excitation circuits 24-28. It will be noted that these excitation circuits also include adjustable resistances 41-45, inclusive, which control or establish the desired times of initiation of conduction by the associated electric valve means 7-11, respectively. More particularly, resistances 36 and 41-45, inclusive, are controlled so that each pair of electric valve means may be initiated in conduction at times during the cycle of associated phase voltage for a period or interval of time not less than 60 electrical degrees. In this manner, proper energization of transformers 3-5 is obtained since it is desired to transmit to these transformers three phase alternating current during the intervals of time in which it is desired to effect energization of the welding circuit 1.

Polyphase alternating current is transmitted to transformers 40 of excitation circuits 23-28, inclusive, from a suitable source of alternating current which may be derived from the supply circuit 2 through transformers 46 and 47 which may be connected in a conventional open delta. The output circuit 48 of these transformers may be connected to suitable phase shifting means, such as a rotary phase shifting device 49, which permits control or adjustment of the phase of the voltages applied to transformers 40 and, hence, controls the time during the cycles of voltage applied to electric valve means 6–11 at which these electric valve means are rendered conducting. Consequently, the phase shifting device 49 affords an arrangement for controlling the amount of current transmitted to the welding circuit 1. If desired, a relay 50 may be connected between the phase shifting device 49 and transformers 40 to disconnect the source of alternating current therefrom. Actuating coil 51 of relay 50 may be controlled by means of a switch 52.

I provide means for simultaneously controlling the excitation circuits 23–28. This means may comprise a plurality of circuit controlling means arranged to render the excitation circuits 23–28 operative simultaneously in response to a single circuit controlling operation. For the purpose of illustration, I have chosen to represent this circuit controlling means as comprising a contactor or relay means 53 comprising contacts 54–59, inclusive, and including an actuating coil 60. The relay 53 may be designed so that the contacts 54–59, inclusive, are biased to the open circuit position when the actuating coil 60 is not energized. Time delay means, such as a relay 61, may be employed to prevent operation of the relay 53 until the filaments of the electric discharge devices employed in the system have assumed safe operating temperatures. An interconnecting relay 62 may be connected between relay 61 and the circuit for energizing actuating coil 60 so that upon operation of relay 61, relay 62 closes its contacts assuring energization of the actuating coil 60. A suitable timing means, such as a relay 63 having contacts 64 in series relation with the actuating coil 60, is employed for effecting energization of the actuating coil 60 for a predetermined interval of time at the expiration of which relay 63 opens its contacts 64, thereby effecting deenergization of the coil 60 and consequently opening contacts 54–59. Manually operable means or automatic means may be employed for controlling initiating switch 65. If desired, the relay 63 need not be employed, and the period of energization of the welding circuit 1 may be controlled by a switch 66 which is connected in series relation with the actuating coil 60. Of course, if desired, the switch 66 may be employed and maintained in the closed circuit position so that the controlling operation is obtained by use of relay 63 and switch 65.

The operation of the embodiment of my invention shown in Fig. 1 will be explained by considering the system when it is operating to effect energization of the welding circuit 1 for a predetermined interval of time. Upon energization of the supply circuit 2, the various filaments for the electric discharge devices will be energized and upon the expiration of the predetermined interval of time established by relay 61, relay 62 will close its contacts, thereby placing the system in condition for operation. Upon closure of switch 52, relay 50 is closed and the source of alternating current for energizing transformers 40 is effectively connected to excitation circuits 23–28, inclusive. The electric valve means 6–11, inclusive, are maintained nonconducting by virtue of the fact that the anode-cathode circuits for electric discharge devices 29 are open. Upon closure of switch 65, switches 66 and 52 being in the closed circuits positions, actuating coil of relay 53 is energized, effecting simultaneous closure of contacts 54–59 and thereby rendering excitation circuits 23–28 in condition for operation.

The various pairs of electric valve means 6–11 are selectively controlled by excitation circuits 23–28, so that these electric valve means conduct current in a predetermined order. The electric valves of each pair conduct current during intervals of time displaced 180 electrical degrees relative to the voltage of the supply circuit 2. At any one time two electric valves conduct current. For example, the following electric valves conduct current simultaneously during succeeding 60 electrical degree intervals: 6, 9; 6, 11; 8, 11; 8, 7; 10, 7; 10, 9. It will thus be appreciated that each electric valve conducts current for 120 electrical degrees but for only 60 electrical degrees with any one other electric valve. The excitation circuits 23–28 establish a minimum period of time within which each electric valve means may be initiated in its conduction of current. More particularly, the excitation circuits establish a minimum period of 60 electrical degrees relative to the voltage of supply circuit 2 within which the conduction of current by the electric valve means may be initiated. The control to establish this range is obtained by adjustment of resistances 36 and 41–46, inclusive.

Alternating current is transmitted to transformers 3–5, inclusive, by the electric valve means 6–11 which conduct current in a predetermined order. Rectifiers 14 and 15 rectify the alternating voltage appearing across the terminals of the secondary winding means 13 to supply unidirectional current to the welding circuit 1.

At the expiration of the period of time established by relay 63, contacts 64 are opened thereby effecting deenergization of actuating coil 60 and causing the contacts 54–59 to open. As a result, the excitation circuits 23–28 are prevented from further operation and consequently electric valve means 6–11 are prevented from conducting current. In this manner, the period of energization of the welding circuit 1 is terminated after having effected energization of the welding circuit for a predetermined interval of time.

If it is desired, the period of energization of the welding circuit 1 may be controlled by operation of switch 52, in which case it will be understood that excitation circuits 23–28, inclusive, maintain the electric discharge devices 29 nonconducting. Upon the closure of switch 52, alternating voltages are impressed on grids 30 of discharge devices 29, thereby rendering the discharge devices conducting at the desired times. In those cases where the switch 52 is employed, it will be understood that relay 63 and switch 65 need not be employed.

Fig. 2 diagrammatically illustrates another embodiment of my invention as applied to a system for energizing the welding circuit 1 from the supply circuit 2. The pairs of electric valve means 6 and 7, 8 and 9, and 10 and 11 are connected between different phases of the supply circuit 2 and polyphase transforming means, such as transformers 67, 68 and 69. Transformers 67–69, inclusive, are energized from different phases of the supply circuit 2 through the respective pairs of associated electric valve means. Biphase rectifiers 70, 71 and 72 are connected between transformers 67–69, respectively, and the welding circuit 1. I provide inductive means, such as a transformer 73, having inductively linked windings 74, 75 and 76 connected in series relation with the output circuits of biphase rectifiers 70–72, respectively. These windings are also connected in series relation with the welding circuit 1 and serve to prevent back excitation on pairs of electric valve means occasioned by conduction of another pair of electric valve means so that the conduction by electric valve means may be initiated at the proper point in the cycle of alternating voltage, thereby assuring accurate energization of the welding circuit 1.

I employ electric discharge devices 77–82, inclusive, associated with electric valve means 6–11, respectively, for controlling the energization of the control members 19 thereof. Discharge devices 77–82, inclusive, may be of the type employing an ionizable medium, such as a gas or a vapor, and each is provided with a control grid 83. The anode-cathode circuits of discharge devices 77–82 are connected between the anodes and the control members 19 of the associated electric valve means. The potentials of control grids 83 are normally maintained negative, thereby preventing conduction by the electric discharge devices except during those intervals when conduction is desired. The biasing potentials may be provided by suitable means such as batteries 84.

In order to control selectively the conductivities of the various pairs of associated electric valve means to render the electric valve means conducting in a predetermined order or sequence by controlling the energization of the control members 19, I provide a plurality of individual control circuits 85, 86 and 87. Control circuits 85–87 control the application of energizing voltage to grids 83 of discharge devices 77–82. Control circuits 85–87 include electric discharge devices 88 and 89, 90 and 91, and 92 and 93, respectively. The voltages impressed on grids 83 of discharge devices 77–82 are preferably voltages of peaked wave form, and voltages of this type may be provided by means of saturable peaking transformers 94, 95 and 96 which selectively connect the grids of the discharge devices associated with the respective pairs of electric valve means to control circuits 85, 86 and 87, respectively. The control circuits 85, 86 and 87 are coupled to the grid circuits of discharge devices 77–82 through transformers 97–102. As a means for controlling the magnitude of the current transmitted to the welding circuit 1, I provide means for controlling the phase of the voltages impressed on the grids 83 of the electric discharge devices 77–82. More particularly, I may employ suitable phase shifting means such as a rotary phase shifter 103 which is connected between the supply circuit 2 and the primary windings of peaking transformers 94–96.

I provide timing means for generating an electrical quantity to control the period of energization of the welding circuit 1. Furthermore, the timing means may be controlled by additional means described hereinafter to generate an electrical timing quantity so that the period of energization of the welding circuit 1 is controlled as well as the period or interval of time between each energization of the welding circuit. More specifically, I provide a timing means 104 which may be of the inverter type comprising a pair of electric discharge devices 105 and 106. These discharge devices may also be of the type employing an ionizable medium and each comprises an anode 107, a cathode 108 and a control means such as a grid 109. The timing means 104 may be energized from a suitable source of direct current comprising a positive conductor 110 and a negative conductor 111. The source may be supplied by a suitable rectifier 112 energized from the supply circuit 2 and may include a filtering circuit including an inductance 113 and a capacitance 114.

The timing means 104 may be arranged so that when the discharge device 106 is conducting a negative voltage is produced, thereby maintaining the electric discharge devices 88–93 nonconducting and thereby preventing energization of the welding circuit 1. A positive impulse of voltage is produced when current is commutated from discharge device 106 to discharge device 105, thereby rendering the discharge devices 88–93 conducting and causing energization of the welding circuit 1 for a period of time determined by the time constants of the timing means 104.

The timing means 104 is essentially an electric valve inverter comprising two electric valve means, both of which are energized from a direct current source including conductors 110 and 111 through a common resistance 115. In series relation with the anode-cathode circuits of electric discharge device 105, I employ impedance elements such as resistances 116 and 117, and in series relation with the anode-cathode circuit of discharge device 106 I connect a resistance 118. In order to commutate the current between discharge devices 105 and 106, a commutating capacitance 119 is employed and is preferably connected between the anodes of the discharge devices.

To control the time during which a positive voltage is produced by the timing means 104, I connect a capacitance 120 in circuit with resistance 117 and grid 109 of the discharge device 106. A discharge circuit for the capacitance 120 is provided and includes a resistance 121', winding 136 and a portion of resistance 122. The duration of time during which the control voltage produced by circuit 104 is positive is determined by the time that the discharge device 106 is nonconducting, or the period of time that the discharge device 105 is conducting. Adjustment of resistance 117 establishes the time during which the discharge device 106 is nonconducting.

The time at which the positive portion of the electrical timing quantity produced by circuit 104 is initiated is determined at the time discharge device 106 is rendered nonconducting. A suitable component of unidirectional voltage is impressed on grid 109 of discharge device 106 from a voltage divider comprising a resistance 121 and a resistance 122. This voltage cooperates with a voltage of peaked wave form, described hereinafter and accurately initiates conduction by discharge device 106.

The timing circuit 104 and the capacitance controlling circuit therefor for controlling the conductivities of associated electric discharge devices are disclosed and claimed in my copending patent application Serial No. 440,159, filed concurrently herewith, now United States Letters Patent 2,348,553, granted May 9, 1944, and assigned to the assignee of the present application.

So that the initiation of conduction by the various pairs of electric valve means 6–11 is initiated at times during the respective cycles of the phase voltages which will not cause starting current transients, I provide means for assuring control of the time of initiation of conduction by the electric valve means. This means may be connected to the control circuits 85–87 and may comprise electric discharge devices 123, 124 and 125. The discharge devices 123–125 are associated with, and control circuits 87, 86 and 85, and consequently control the time at which initiation of conduction is initiated by the respective associated pairs of electric valve means.

To control precisely the conductivities of electric discharge devices 123–125, I provide suitable means for initiating conduction by these discharge devices at precise times during the respective cycles of phase voltage of the supply circuit 2. These means may comprise saturable peaking transformers 126, 127 and 128 of the type whereby the phase of the output voltage may be controlled by phase shifting means comprising resistances 129, 130 and 131 which control the phase of the voltage impressed on the primary winding means. Secondary windings 132, 133 and 134 are connected to grids 135 of discharge devices 123–125, respectively. Peaking transformer 127 is also provided with an additional secondary winding 136 which is connected to grid 109 of electric discharge device 106 to control accurately the time at which electric discharge device 106 is rendered conducting with respect to the voltage of the supply circuit 2.

The discharge device 105 in the timing means 104 is normally maintained nonconducting by impressing on its grid 109 the negative hold-off voltage across resistance 115 through transformer 137, the secondary winding 138 thereof being connected between the grid 109 and the negative conductor 111 of the direct current source. The primary winding 139 of transformer 137 is connected in series relation with the anode-cathode circuit of electric discharge device 123 and when energized by the discharge device 123 impresses a positive voltage on grid 109 sufficient to overcome the effect of the hold-off potential and initiates operation of the timing means 104.

Discharge device 123 is normally maintained nonconducting. In order to obtain an impulse of current for energizing transformer 137 and, hence, for rendering the discharge device 105 conducting, I provide a capacitance 140 which is charged from the source of direct current including conductors 110 and 111 through resistance 141 which constitutes a portion of a voltage divider including another resistance 142. Capacitance 140 is selectively charged and discharged by means of a relay 143 having an actuating coil 144 and contacts 145 and 146. Contacts 146 are the charging contacts which when in the closed circuit position connect capacitance 140 across resistance 141; and contacts 145 are the discharge contacts which when in the closed circuit position connect the capacitance 140 in series relation with the primary winding 139 of transformer 137 and the anode-cathode circuit of the discharge device 123.

It will be noted that the timing voltage produced by means 104 is impressed on the anodes of the discharge devices 124 and 125 through a conductor 146, and that the potential of the cathodes of the discharge devices 88—93 is determined by a voltage divider including resistances 147 and 148 and which is connected to the source of direct current. The voltage which renders the discharge devices 92 and 93 conductive is derived from the anode of discharge device 106 through a conductor 149; the voltage which renders the discharge devices 90 and 91 conductive is obtained by utilizing the voltage drop across a resistance 150 connected in the anode-cathode circuit of the discharge device 124. Resistance 150 is connected to the grids of discharge devices 90 and 91 through a conductor 151. In like manner, the grids of discharge devices 88 and 89 are connected through a conductor 152 to a resistance 153 connected in the anode-cathode circuit of the discharge device 125.

Where it is desired to effect only a single energization of the welding circuit 1 in response to a single circuit controlling operation, the actuating coil 144 of relay 143 may be energized by a manually operable circuit controlling means, such as a switch 154. However, in those applications where it is desired to effect intermittent or periodic energization of the welding circuit 1, actuating coil 144 may be periodically energized by effecting such energization of this coil. As a means for accomplishing this periodic energization of coil 144, I have illustrated a switch 155 which is periodically closed by means of a motor 156 and suitable interlocking or gearing means 157 which may comprise a cam for operating the switch 155.

The operation of the embodiment of my invention shown in Fig. 2 will be explained by considering the system when it is desired to transmit to the welding circuit 1 a direct current of predetermined magnitude for a definite interval of time. The magnitude of the current transmitted to the welding circuit 1 is established by the adjustment of the rotary phase shifter 103. The interval of energization is determined by the adjustment of resistance 117. Peaking transformers 126–128 are adjusted by means of resistances 129–131, respectively, so that the initiation of conduction of current by electric valve means 6–11 occurs at times corresponding to the power factor angle of the load imposed on the supply circuit 2. That is, each of the individual pairs of electric valve means is adjusted to begin conduction during the respective phase voltages at that time corresponding to the power factor angle, thereby preventing the occurrence of starting current transients.

The electric valve means 6–11 are normally non-conducting inasmuch as the associated control electric discharge devices 77–82 are maintained nonconducting by virtue of the negative biasing potentials impressed on the grids 83 of discharge devices 77–82. Furthermore, the discharge devices 88–93 in control circuits 85–87 are maintained nonconducting by virtue of the negative potentials impressed on the grids thereof, preventing the application of the peaked voltages produced by transformers 94–96 on the grids 83 of discharge devices 77–82.

Capacitance 140 is charged to the polarity indicated on the drawings from the direct current source by virtue of the voltage drop across resistance 141. The charging circuit of capacitance 140 is completed through contacts 146 of relay 143. Initiation of the period of conduction of the welding circuit 1 is accomplished by closure of switch 154 which energizes actuating coil 144 and opens contacts 146 and closes contacts 145, the latter contacts connecting the capacitance 140 in the anode-cathode circuit of discharge device 123. However, the discharge device 123 does not necessarily conduct instantly since its grid 135 is maintained at a negative potential by virtue of the voltage drop across resistance 142. However, as soon as a positive voltage of peaked wave form occurs in the secondary winding 132, the negative biasing potential is neutralized and the discharge device 123 is rendered conducting at the desired time during the cycle of the associated phase voltage. Upon being rendered conducting, discharge device 123 transmits an impulse of current through primary winding 139 which, in turn, impresses a positive voltage on grid 109 of discharge device 105, causing it to conduct current and thereby commutating the current from the discharge device 106 which was previously conducting. As soon as the discharge device 106 is commutated, that is rendered nonconducting, its anode voltage becomes positive as the capacitance 119 is charged in the opposite direction. This rapid raise of anode potential of this discharge device causes a rapid reversal of the normally negative potential applied to the grids of discharge devices 92 and 93 in control circuit 87. These latter discharge devices are connected to act effectively as a switch so that when conducting current the output of transformer 96 is impressed on transformers 101 and 102 and consequently on grids 83 of discharge devices 81 and 82, thereby ultimately effecting energization of control members 19 of the pair of electric valve means 10 and 11. Thus it will be understood that the primary winding of transformer 60 is excited through the reversely connected electric valve means 10 and 11 at the proper point in the cycle of associated phase voltage determined by the phase setting of the peaking transformer 126 to eliminate any transient in the power transforming means. It should be noted that this point in the cycle will not coincide with the normal conduction initiation point as determined by phase shifter 103, but may be later in the cycle as in the case when the maximum output of the system is desired, or earlier in the cycle when minimum heat or minimum load current or welding current is used.

As the anode voltage of discharge device 106 becomes positive it also produces a positive voltage in the anode circuit of discharge devices 124 and 125. These discharge devices, however, do not begin to conduct current immediately since they are maintained nonconducting by the negative biasing potential appearing across resistance 142, and consequently conduction by these discharge devices is delayed until the proper instants in the cycles of the associated phase voltages as determined by the phase position of the voltages of secondary windings 133 and 134 of peaking transformers 127 and 128. As these two discharge devices are rendered conducting at the proper phase positions, discharge devices 90, 91 and 88, 89 are rendered conducting at the desired corresponding angles. The pairs of discharge devices 90, 91 and 88, 89 effectively connect transformers 99, 100 and 97, 98 in circuit with transformers 95, 94 to energize the grids 83 of discharge devices 79, 80 and 77, 78. In this manner, the electric valve means 8, 9 and 6, 7 are rendered conducting at the proper instants during the cycles of the respective associated phase voltages.

After all three sets or pairs of electric valve means have conducted current, these electric valve means continue to conduct current in the usual sequential manner determined by the order of phase rotation of the polyphase system of voltages of circuit 2, starting to conduct current at the proper phase position as determined by rotary phase shifter 103. This operation continues as long as the anode of the discharge device 106 remains positive. However, the timing capacitance 120 discharges through a circuit including resistance 121' winding 136 and the lower portion of resistance 122. After a definite time interval, as determined by these circuit constants, the grid of the discharge device 106 again becomes more positive than the critical grid voltage for this discharge device, causing this discharge device to conduct current. When the discharge device 106 transmits current, its anode voltage drops immediately and reestablishes the negative voltage on the grids of the coupling discharge devices 88-93, inclusive, which in turn remove the excitation from the remainder of the system. Thus, the next time the alternating current supplied to the system passes through zero, electric valve means 6-11 become nonconducting, or whichever pair is then conducting becomes nonconducting, and the energization of welding circuit 1 is terminated. No further current will then be transmitted to the welding circuit 1 until switch 154 is released and reset.

It will thus be apparent that with the above arrangement it is possible to employ the system which I disclose in spot welding applications where it is desired to transmit a predetermined magnitude of current to the welding circuit for a definite interval of time.

If it is desired to effect intermittent or periodic energization of the welding circuit 1, the actuating coil 144 of relay 143 may be periodically or intermittently energized by means of switch 155 and motor 156. The speed of the motor 156 is preferably adjusted so that the contacts 155 are maintained closed for a period of time somewhat greater than the positive impulse of biasing voltage produced by timing means 104. The time that the contacts of switch 155 are maintained open will establish the period of time between each successive energization of the welding circuit 1.

While I have shown and described my invention as applied to particular systems of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current supply circuit, a load circuit, transforming means, a pair of reversely connected electric valve means connected between said supply circuit and said transforming means for transmitting alternating current thereto, said electric valve means comprising control means, an electric inverter energized from said supply circuit for producing a periodic electric timing quantity and comprising an electric discharge device, means tending to prevent operation of said inverting means, means connected between said inverting means and said control means for supplying energizing potential to said control means when said inverter is operating, and means for initiating operation of said inverter and for rendering said electric valve means conductive for a predetermined interval of time determined by said timing quantity.

2. In combination, an $n$ phase alternating current supply circuit, a load circuit, transforming means comprising $n$ windings, $n$ pairs of reversely connected electric valve means each connected between a different phase of said supply circuit and a different one of said windings, said electric valve means each having a control member for controlling the conductivity thereof, and a plurality of means each associated with a different one of said pairs of electric valve means and each connected to the respective control members for rendering said electric valve means conducting in a predetermined order and at times during the respective cycles of phase voltages corresponding to the power factor angle of the load imposed on said supply circuit.

3. In combination, a polyphase alternating current supply circuit, a load circuit, transforming means comprising a plurality of winding sections, a plurality of pairs of reversely connected electric valve means each connected between a different phase of said supply circuit and a different one of said winding sections, said electric valve means each having a control member for controlling the conductivity thereof, timing means for producing a timing quantity to control the period of energization of said load circuit, and means connected between said timing means and the control members of said electric valve means to render each of the various pairs conducting at a time during the cycle of the associated phase voltage corresponding to the power factor angle of the load imposed on said supply circuit.

4. In combination, a polyphase alternating current supply circuit, a load circuit, transforming means comprising a plurality of winding sections, a plurality of pairs of reversely connected electric valve means connected between said supply circuit and said transforming means, said electric valve means each having a control member for controlling the conductivity thereof, timing means for producing an electrical quantity for determining the period of energization of said load circuit, means for producing a polyphase system of control voltages, and means connected between said timing means and said last mentioned means for rendering said plurality of pairs of electric valve means conducting at times during the respective cycles of associated phase voltages corresponding to the power factor angle of the load imposed on said supply circuit thereby substantially eliminating the starting current transient.

5. In combination, a polyphase alternating current supply circuit, a load circuit, transforming means comprising a plurality of winding sections, a plurality of circuit controlling means each connected between a different phase of said supply circuit and a different one of said winding sections, timing means for controlling the period of energization of said load circuit, and means responsive to said timing means for effecting operation of said circuit controlling means and for closing the circuits to the various winding sections at times during the cycles of the respective phase voltages corresponding to the power factor angle of the load imposed on said supply circuit.

6. In combination, a polyphase alternating current supply circuit, a load circuit, transforming means including a plurality of winding sections, a plurality of electric valve means connected between different phases of said supply circuit and different winding sections, said electric valve means each comprising control means, timing means for producing an electrical quantity to control the period of energization of said load circuit, a plurality of control circuits for selectively energizing the control means of said electric valve means and each comprising an electric discharge device for controlling the application of energizing voltage to the associated control means, a plurality of individual control circuits connected to operate consecutively in timed relation with respect to the order of phase rotation of the phase voltages of said supply circuit, and means connected between said timing means and the last mentioned control circuits for rendering said last mentioned control circuits operative for a period of time established by said electrical quantity.

7. In combination, a polyphase alternating current supply circuit, a load circuit, transforming means, a plurality of pairs of reversely connected electric valve means connected between different phases of said supply circuit and said transforming means, said electric valve means each having a control member for controlling the conductivity thereof, a plurality of electric discharge devices each associated with a different one of said electric valve means for controlling the associated control member, and a plurality of means for controlling the conductivities of said electric discharge devices including means for producing a negative unidirectional biasing potential tending to maintain the discharge devices nonconducting, means for superimposing on said biasing potentials periodic voltages of predetermined phase relation and means for controlling the magnitude of said biasing potential so that each pair of electric valve means may be rendered conducting during a period not less than 60 electrical degrees of the voltage of said supply circuit.

8. In combination, a polyphase alternating current supply circuit, a load circuit, a polyphase transforming means, a plurality of pairs of reversely connected electric valve means, each pair being connected between a different phase of said supply circuit and said polyphase transforming means, said electric valve means each comprising a control member for controlling the conductivity thereof, a plurality of electric discharge devices each associated with a different one of said electric valve means and each connected to the associated control member thereof, a plurality of circuit controlling means connected to said discharge devices, and means for operating said circuit controlling means simultaneously.

9. In combination, a polyphase alternating current supply circuit, a load circuit, transforming means comprising a plurality of winding sections, a plurality of electric valve means each connected between a different phase of said supply circuit and said winding sections, and means for controlling said electric valve means sequentially to effect energization of the associated winding sections at times during the cycles of the respective phase voltages corresponding to the power factor angle of the load imposed on said supply circuit.

10. In combination, a polyphase alternating current supply circuit, a load circuit, transforming means, a plurality of pairs of reversely connected electric valve means connected between said supply circuit and said transforming means, each pair of electric valve means being connected to a different phase of said supply circuit, and means for controlling said pairs of electric valve means to permit initiation of conduction of the pairs during each cycle of voltage of said supply circuit for a period not less than 60 electrical degrees.

11. In combination, a polyphase alternating current supply circuit, a load circuit, transforming means including a plurality of winding sections, a plurality of circuit controlling means each connected between a different phase of said supply circuit and said winding sections, and means for controlling said circuit controlling means to conduct current sequentially and to initiate conduction thereby at times during the cycles of the respective associated phase voltages corresponding to the power factor angle of the load imposed on said supply circuit.

12. In combination, an $n$ phase alternating current supply circuit, a load circuit, $n$ single phase transforming means each including a primary winding and a secondary winding, $n$ pairs of reversely connected electric valve means, said electric valve means and said primary windings being connected in an $n$-sided mesh with each side of the mesh including in series one pair of reversely connected electric valves and the primary winding of one of the transformers, said mesh being connected for energization from said alternating current supply circuit, means for controlling the initiation of conduction of said electric valve means synchronously with respect to the voltage of said supply circuit for effecting the successive energization of said primary windings each at the same phase position in the voltage wave of the phase from which it is energized, a plurality of biphase rectifiers connected to said transforming means, and inductive means connected between said load circuit and said plurality of biphase rectifiers for inductively linking the output circuits of said biphase rectifiers.

ORRIN W. LIVINGSTON.